United States Patent
Park et al.

(10) Patent No.: US 10,019,821 B2
(45) Date of Patent: Jul. 10, 2018

(54) APPARATUS AND METHOD FOR CONSTRUCTING INDOOR MAP USING CLOUD POINT

(71) Applicant: NAVER Business Platform Corp., Seongnam-Si, Gyeonggi-Do (KR)

(72) Inventors: Weongi Park, Seongnam-si (KR); Jaewook Yoo, Seongnam-si (KR); Ho Jin Lee, Seongnam-si (KR); Eun Yong Cheong, Seongnam-si (KR); Byeong-Ryeol Sim, Seongnam-si (KR); Byung-Jo Kim, Seongnam-si (KR)

(73) Assignee: NAVER Business Platform Corp., Seongnam-Si (KR)

( * ) Notice: Subject to any disclaimer, the term of this patent is extended or adjusted under 35 U.S.C. 154(b) by 280 days.

(21) Appl. No.: 14/941,021

(22) Filed: Nov. 13, 2015

(65) Prior Publication Data

US 2016/0071294 A1 Mar. 10, 2016

Related U.S. Application Data

(63) Continuation of application No. PCT/KR2015/007038, filed on Jul. 8, 2015.

(30) Foreign Application Priority Data

Sep. 2, 2014 (KR) .......................... 10-2014-0116220

(51) Int. Cl.
*G06K 9/00* (2006.01)
*G06T 11/20* (2006.01)
(Continued)

(52) U.S. Cl.
CPC ........ *G06T 11/20* (2013.01); *G06F 17/30371* (2013.01); *G06T 7/55* (2017.01);
(Continued)

(58) Field of Classification Search
CPC ... G06T 11/20; G06T 7/55; G06T 7/97; G06T 17/05; G06T 2207/10028; G06F 17/30371; H04W 4/043
See application file for complete search history.

(56) References Cited

U.S. PATENT DOCUMENTS 7,302,359 B2 * 11/2007 McKitterick ............ G01C 7/06
340/990
8,818,768 B1 8/2014 Fan et al.
(Continued)

FOREIGN PATENT DOCUMENTS

CN 102230785 A 11/2011
CN 102622762 A 8/2012
(Continued)

OTHER PUBLICATIONS

Sareen, Kuldeep Kumar. "Consistent Density Scanning and Information Extraction From Point Clouds of Building Interiors." (2012).*

(Continued)

*Primary Examiner* — Jonathan S Lee
(74) *Attorney, Agent, or Firm* — Harness, Dickey & Pierce, P.L.C.

(57) ABSTRACT

An indoor map constructing apparatus may include an information extractor configured to extract cloud point information from scan information about each point inside a target facility of which an indoor map is to be constructed, and an indoor map constructer configured to construct the indoor map of the target facility based on the cloud point information about each point.

22 Claims, 10 Drawing Sheets

(51) Int. Cl.
    *G06F 17/30*    (2006.01)
    *H04W 4/04*     (2009.01)
    *G06T 17/05*    (2011.01)
    *G06T 7/00*     (2017.01)
    *G06T 7/55*     (2017.01)

(52) U.S. Cl.
    CPC ............... *G06T 7/97* (2017.01); *G06T 17/05* (2013.01); *H04W 4/043* (2013.01); *G06T 2207/10028* (2013.01)

(56) References Cited

U.S. PATENT DOCUMENTS

| | | | |
|---|---|---|---|
| 2008/0036755 A1* | 2/2008 | Bae | G06F 17/50 345/418 |
| 2009/0043504 A1* | 2/2009 | Bandyopadhyay | G01C 17/38 701/469 |
| 2009/0262974 A1* | 10/2009 | Lithopoulos | G01C 3/08 382/100 |
| 2011/0282622 A1* | 11/2011 | Canter | G06K 9/00691 702/150 |
| 2012/0130762 A1* | 5/2012 | Gale | G01C 21/20 705/7.13 |
| 2015/0063683 A1* | 3/2015 | Fu | G06K 9/00201 382/154 |
| 2017/0046840 A1* | 2/2017 | Chen | G06T 7/0028 |
| 2017/0122736 A1* | 5/2017 | Dold | G01S 17/023 |

FOREIGN PATENT DOCUMENTS

| | | |
|---|---|---|
| CN | 104732587 A | 6/2015 |
| JP | 2007310866 A | 11/2007 |
| JP | 2014219723 A | 11/2014 |
| KR | 100757751 B1 | 9/2007 |
| KR | 1020110051571 | 5/2011 |
| KR | 20120029976 A | 3/2012 |
| KR | 1020120029976 | 3/2012 |
| KR | 10-1312294 B1 | 10/2013 |
| KR | 1020130112492 | 10/2013 |
| KR | 1020140012573 | 2/2014 |
| TW | 476899 B | 2/2002 |
| TW | 201520992 A | 6/2015 |

OTHER PUBLICATIONS

Nagatani, Keiji, et al. "Multirobot exploration for search and rescue missions: A report on map building in RoboCupRescue 2009." Journal of Field Robotics 28.3 (2011): 373-387.*

Taiwan Office Action dated Aug. 29, 2016 by the Taiwan Patent Office corresponding to Taiwan Patent Application No. 104137479.

Japanese Office Action dated Feb. 7, 2017 by the Japanese Patent Office for corresponding Japanese Patent Application No. 2016-546731.

Taiwanese Office Action dated Aug. 15, 2017 by the Taiwanese Patent Office for corresponding application TW 104137479.

Korean Office Action dated May 1, 2017 by the Korean Patent Office corresponding to Korean Patent Application No. 10-2014-0116220.

* cited by examiner

APPARATUS AND METHOD FOR CONSTRUCTING INDOOR MAP USING CLOUD POINT

CROSS-REFERENCE TO RELATED APPLICATION(S)

This U.S. non-provisional patent application is a continuation of International Application PCT/KR2015/007038, filed Jul. 8, 2015 which claims priority to Korean Patent Application No. 10-2014-0116220, filed on Sep. 2, 2014, the entire contents of each of which are hereby incorporated by reference.

TECHNICAL FIELD

Various example embodiments relate to an apparatus and/or method for constructing an indoor map.

RELATED ART

With the recent spread of smartphones and developments in mobile communication networks, users may utilize a variety of information and services readily without restrictions on a time and an occasion.

Location based services may be used utilized for bus/subway arrival time notification, navigation, etc., to provide users with information suitable for various purposes. To provide such a location based service to a user, accurate location information of the user or a target object is desired. In general, the location information is acquired based on a global positioning system (GPS) signal. However, in the case of acquiring location information based on a GPS signal, it may be difficult to measure an actual location of a user or a target object in a shadowing area of the GPS signal. For example, in an area between buildings, an area in which the GPS signal does not readily reach such as an inside of a building, etc.

In addition, an indoor map may be constructed using a measurement method. In the case of using the measurement method, measurements from a relatively large number of persons may be required to generate the indoor map of a target building. An amount of time to generate the indoor map may also increase according to an increase in a size and/or complexity of the target building. Further, when many people participate in the measurement, an error occurrence rate may increase in drawing the indoor map such that different surveyors may draw a different indoor map.

Accordingly, there is a need for technology for decreasing an error occurrence rate in a drawing while accurately and quickly constructing an indoor map.

SUMMARY

Some example embodiments provide an indoor map constructing apparatus and/or a method that may construct an indoor map by automatically mapping a location and an image corresponding to each point using a location-image plug-in in order to decrease a drawing operation error occurring when constructing the indoor map.

Some example embodiments also provide an indoor map constructing apparatus and/or method that may automatically correct a drawing operation error using a desired (or, alternatively, a predefined)structured query language (SQL) function in order to provide a further fast and accurate indoor map.

Some example embodiments also provide an indoor map constructing apparatus and/or method that may process a service indoor map and may provide the processed service indoor map to a user in order to provide a location based service.

According to at least one example embodiment, an apparatus may include a processor configured to extract cloud point information from scan information associated with points inside a target facility, and construct the indoor map of the target facility in response to performing a drawing operation on a shape of the target facility based on the cloud point information.

According to at least one example embodiment, the processor may be further configured to perform the drawing operation on a shape of the target facility by synthesizing or filtering a cross-section of the target facility at each of the points based on the cloud point information.

According to at least one example embodiment, the processor may be further configured to acquire attribute information associated with the points, and construct the indoor map by mapping the attribute information to space information associated with the target facility.

According to at least one example embodiment, the processor may be further configured to determine whether the drawing operation contains errors using a structured query language (SQL) function.

According to at least one example embodiment, the processor may be further configured to automatically correct the errors in the drawing operation based on attribute information and image information associated with the points inside the target facility According to at least one example embodiment, the processor may be further configured to construct the indoor map such that the indoor map maps an inside of the target facility to an absolute coordinate system.

According to at least one example embodiment, the processor may be further configured to construct the indoor map such that the indoor map has a same coordinate system as an outdoor map of an area outside the target facility According to at least one example embodiment, the processor may be further configured to process the indoor map to designate a different color to the points inside the target facility According to at least one example embodiment, the apparatus is configured to receive the scan information from a scan device configured to scan the points inside the target facility, and the processor is further configured to correct a drawing error based on acceleration information associated with the scan device. According to at least one example embodiment, the apparatus may further include one or more of a 3-dimensional scanner and a camera configured to collect scan information and image information, respectively.

Some example embodiments are related to a method of constructing an indoor map of a target facility.

In some example embodiments, the method includes extracting cloud point information from scan information associated with points inside the target facility of which the indoor map is to be constructed, and constructing the indoor map of the target facility based on the cloud point information.

According to at least one example embodiment, the constructing of the indoor map includes performing a drawing operation on a shape of the target facility based on the cloud point information; acquiring attribute information associated with each point; and constructing the indoor map by mapping the acquired attribute information to space information associated with the target facility.

According to at least one example embodiment, the constructing of the indoor map includes performing the drawing operation on the shape of the target facility by synthesizing or filtering a cross-section of the target facility at each point based on the cloud point information.

According to at least one example embodiment, the constructing of the indoor map includes determining whether the drawing operation contains errors using a structured query language (SQL) function; and automatically correcting the errors in the drawing operation based on attribute information and image information associated with the points inside the target facility.

According to at least one example embodiment, the constructing of the indoor map includes constructing the indoor map such that the indoor map maps an inside of the target facility to an absolute coordinate system.

According to at least one example embodiment, the constructing of the indoor map includes processing the indoor map to designate a different color to the points inside the target facility.

According to at least one example embodiment, the method further includes collecting, from a scan device, scan information and image information associated with each of the points inside the target facility.

According to at least one example embodiment, the constructing of the indoor map includes correcting a drawing error based on acceleration information associated with the scan device.

Some example embodiments are related to a method of constructing an indoor map by a scan device.

In some example embodiments, the method includes generating scan information by scanning points inside a target facility; and constructing an indoor map of the target facility by filtering processing the scan information.

According to at least one example embodiment, the constructing of the indoor map includes constructing the indoor map that such that the indoor map connects inner walls of the target facility with lines through the filtering processing.

According to at least one example embodiment, the constructing of the indoor map includes performing a primary drawing operation and a secondary drawing operation, the primary drawing operating including drawing the inner walls, and the second drawing operation including drawing an inside of the target facility through a server connected to the scan device.

According to at least one example embodiment, the constructing of the indoor map includes correcting a drawing error based on acceleration information associated with the scan device.

According to at least one example embodiment, the processor is configured to acquire the scan information from one or more coordinated scan devices.

According to at least one example embodiment, the processor is perform optical character recognition (OCR) on image information received from the one or more coordinated scan devices to generate attribute information, and associate the points with one or more of a plurality of service provider types based on the attribute information.

According to at least one example embodiment, the image information includes a panoramic image.

According to at least one example embodiment, the processor is configured to correlate the image information and the scan information such that the points have an image associated therewith.

According to at least one example embodiment, the apparatus may further include an interface configured to receive the image information and the scan information from the one or more coordinated scan devices.

According to at least one example embodiment, the processor is configured to register the indoor map to absolute coordinates.

According to some example embodiments, since an indoor map is constructed by automatically mapping a location and an image corresponding to each point using a location-image plug-in, it may be possible to decrease a drawing operation error occurring when constructing the indoor map.

According to some example embodiments, since a drawing operation error is automatically corrected using a desired (or, alternatively, a predefined)structured query language (SQL)function, it may be possible to provide a further fast and accurate indoor map.

According to some example embodiments, it may be possible to process a service indoor map and to provide the processed service indoor map to a user in order to provide a location based service.

BRIEF DESCRIPTION OF DRAWINGS

Example embodiments will be described in more detail with regard to the figures, wherein like reference numerals refer to like parts throughout the various figures unless otherwise specified, and wherein.

DETAILED DESCRIPTION

Figure 1:
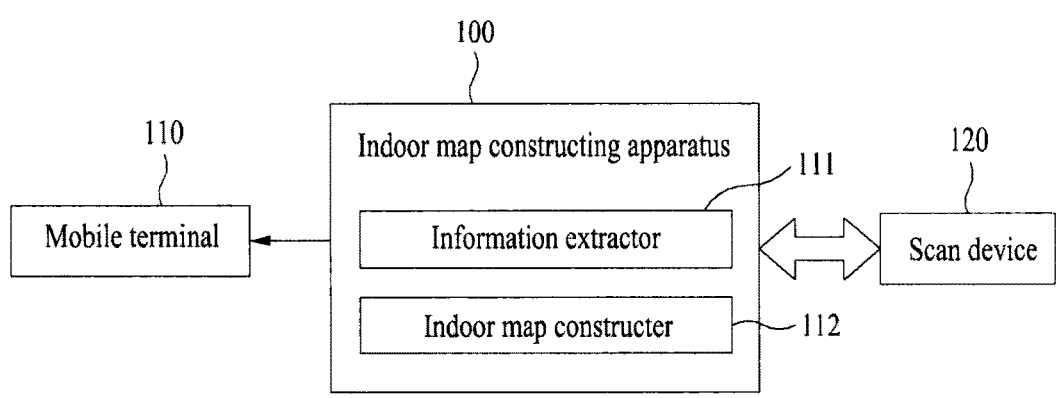
FIG. 1 is a block diagram illustrating an example of an indoor map constructing apparatus according to at least one example embodiment.

One or more example embodiments will be described in detail with reference to the accompanying drawings. Example embodiments, however, may be embodied in various different forms, and should not be construed as being limited to only the illustrated embodiments. Rather, the illustrated embodiments are provided as examples so that this disclosure will be thorough and complete, and will fully convey the concepts of this disclosure to those skilled in the art. Accordingly, known processes, elements, and techniques, may not be described with respect to some example embodiments. Unless otherwise noted, like reference characters denote like elements throughout the attached drawings and written description, and thus descriptions will not be repeated.

Although the terms "first," "second," "third," etc., may be used herein to describe various elements, components, regions, layers, and/or sections, these elements, components, regions, layers, and/or sections, should not be limited by these terms. These terms are only used to distinguish one element, component, region, layer, or section, from another region, layer, or section. Thus, a first element, component, region, layer, or section, discussed below may be termed a second element, component, region, layer, or section, without departing from the scope of this disclosure.

Spatially relative terms, such as "beneath," "below," "lower," "under," "above," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below," "beneath," or "under," other elements or features would then be oriented "above" the other elements or features. Thus, the example terms "below" and "under" may encompass both an orientation of above and below. The device may be otherwise oriented (rotated 90 degrees or at other orientations) and the spatially relative descriptors used herein interpreted accordingly. In addition, when an element is referred to as being "between" two elements, the element may be the only element between the two elements, or one or more other intervening elements may be present.

As used herein, the singular forms "a," "an," and "the," are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups, thereof. As used herein, the term "and/or" includes any and all combinations of one or more of the associated listed items. Expressions such as "at least one of," when preceding a list of elements, modify the entire list of elements and do not modify the individual elements of the list. Also, the term "exemplary" is intended to refer to an example or illustration.

When an element is referred to as being "on," "connected to," "coupled to," or "adjacent to," another element, the element may be directly on, connected to, coupled to, or adjacent to, the other element, or one or more other intervening elements may be present. In contrast, when an element is referred to as being "directly on," "directly connected to," "directly coupled to," or "immediately adjacent to," another element there are no intervening elements present.

Unless otherwise defined, all terms (including technical and scientific terms) used herein have the same meaning as commonly understood by one of ordinary skill in the art to which example embodiments belong. Terms, such as those defined in commonly used dictionaries, should be interpreted as having a meaning that is consistent with their meaning in the context of the relevant art and/or this disclosure, and should not be interpreted in an idealized or overly formal sense unless expressly so defined herein.

Example embodiments may be described with reference to acts and symbolic representations of operations (e.g., in the form of flow charts, flow diagrams, data flow diagrams, structure diagrams, block diagrams, etc.) that may be implemented in conjunction with units and/or devices discussed in more detail below. Although discussed in a particularly manner, a function or operation specified in a specific block may be performed differently from the flow specified in a flowchart, flow diagram, etc. For example, functions or operations illustrated as being performed serially in two consecutive blocks may actually be performed simultaneously, or in some cases be performed in reverse order.

Units and/or devices according to one or more example embodiments may be implemented using hardware, software, and/or a combination thereof. For example, hardware devices may be implemented using processing circuity such as, but not limited to, a processor, Central Processing Unit (CPU), a controller, an arithmetic logic unit (ALU), a digital signal processor, a microcomputer, a field programmable gate array (FPGA), a System-on-Chip (SoC), a programmable logic unit, a microprocessor, or any other device capable of responding to and executing instructions in a defined manner.

Software may include a computer program, program code, instructions, or some combination thereof, for independently or collectively instructing or configuring a hardware device to operate as desired. The computer program and/or program code may include program or computer-readable instructions, software components, software modules, data files, data structures, and/or the like, capable of being implemented by one or more hardware devices, such as one or more of the hardware devices mentioned above. Examples of program code include both machine code produced by a compiler and higher level program code that is executed using an interpreter.

For example, when a hardware device is a computer processing device (e.g., a processor, Central Processing Unit (CPU), a controller, an arithmetic logic unit (ALU), a digital signal processor, a microcomputer, a microprocessor, etc.), the computer processing device may be configured to carry out program code by performing arithmetical, logical, and input/output operations, according to the program code. Once the program code is loaded into a computer processing device, the computer processing device may be programmed to perform the program code, thereby transforming the computer processing device into a special purpose computer processing device. In a more specific example, when the program code is loaded into a processor, the processor becomes programmed to perform the program code and operations corresponding thereto, thereby transforming the processor into a special purpose processor.

Software and/or data may be embodied permanently or temporarily in any type of machine, component, physical or virtual equipment, or computer storage medium or device, capable of providing instructions or data to, or being interpreted by, a hardware device. The software also may be distributed over network coupled computer systems so that the software is stored and executed in a distributed fashion. In particular, for example, software and data may be stored by one or more computer readable recording mediums, including the tangible or non-transitory computer-readable storage media discussed herein.

According to one or more example embodiments, computer processing devices may be described as including various functional units that perform various operations and/or functions to increase the clarity of the description. However, computer processing devices are not intended to be limited to these functional units. For example, in one or more example embodiments, the various operations and/or functions of the functional units may be performed by other ones of the functional units. Further, the computer processing devices may perform the operations and/or functions of the various functional units without sub-dividing the operations and/or functions of the computer processing units into these various functional units.

Units and/or devices according to one or more example embodiments may also include one or more storage devices. The one or more storage devices may be tangible or non-transitory computer-readable storage media, such as random access memory (RAM), read only memory (ROM), a permanent mass storage device (such as a disk drive), solid state (e.g., NAND flash) device, and/or any other like data storage mechanism capable of storing and recording data. The one or more storage devices may be configured to store computer programs, program code, instructions, or some combination thereof, for one or more operating systems and/or for implementing the example embodiments described herein. The computer programs, program code, instructions, or some combination thereof, may also be loaded from a separate computer readable storage medium into the one or more storage devices and/or one or more computer processing devices using a drive mechanism. Such separate computer readable storage medium may include a Universal Serial Bus (USB) flash drive, a memory stick, a Blu-ray/DVD/CD-ROM drive, a memory card, and/or other like computer readable storage media. The computer programs, program code, instructions, or some combination thereof, may be loaded into the one or more storage devices and/or the one or more computer processing devices from a remote data storage device via a network interface, rather than via a local computer readable storage medium. Additionally, the computer programs, program code, instructions, or some combination thereof, may be loaded into the one or more storage devices and/or the one or more processors from a remote computing system that is configured to transfer and/or distribute the computer programs, program code, instructions, or some combination thereof, over a network. The remote computing system may transfer and/or distribute the computer programs, program code, instructions, or some combination thereof, via a wired interface, an air interface, and/or any other like medium.

The one or more hardware devices, the one or more storage devices, and/or the computer programs, program code, instructions, or some combination thereof, may be specially designed and constructed for the purposes of the example embodiments, or they may be known devices that are altered and/or modified for the purposes of example embodiments.

A hardware device, such as a computer processing device, may run an operating system (OS) and one or more software applications that run on the OS. The computer processing device also may access, store, manipulate, process, and create data in response to execution of the software. For simplicity, one or more example embodiments may be exemplified as one computer processing device; however, one skilled in the art will appreciate that a hardware device may include multiple processing elements and multiple types of processing elements. For example, a hardware device may include multiple processors or a processor and a controller. In addition, other processing configurations are possible, such as parallel processors.

Although described with reference to specific examples and drawings, modifications, additions and substitutions of example embodiments may be variously made according to the description by those of ordinary skill in the art. For example, the described techniques may be performed in an order different with that of the methods described, and/or components such as the described system, architecture, devices, circuit, and the like, may be connected or combined to be different from the above-described methods, or results may be appropriately achieved by other components or equivalents.

FIG. 1 is a block diagram illustrating an example of an indoor map constructing apparatus according to some example embodiments.

FIG. 1 illustrates a mobile terminal 110 of a user, an indoor map constructing apparatus 100, and a scan device 120.

The mobile terminal 110 may be a portable device of the user capable of performing mobile communication and data communication such as a smartphone, etc. The indoor map constructing apparatus 100 may be a server that provides an indoor map to the mobile terminal 110. For example, the indoor map constructing apparatus 100 may provide a service indoor map to the mobile terminal 110 in response to a request from the mobile terminal 110.

The mobile terminal 110 may receive the service indoor map from the indoor map constructing apparatus 100.

As discussed below in more detail in regard to FIG. 7, in some example embodiments, the indoor map constructing apparatus 100 may include one or more processors, that when executing computer readable code stored in a memory, configure the processor to function as an information extractor 111 and an indoor map constructer 112 to provide the service indoor map to the mobile terminal 110.

The scan device 120 may transmit, to indoor map constructing apparatus 100, scan information and image information generated by scanning an inside of a target facility using a laser scanner, a camera, etc. The indoor map constructing apparatus 100 may construct an indoor map of the target facility based on the scan information and the image information, may process the constructed indoor map to generate the service indoor map, and may provide the service indoor map to the mobile terminal 110.

As discussed in more detail below, in some example embodiments, the scan device 120 may include a processor, a memory, a three-dimensional (3D) laser scanner and a panorama camera (not shown). The memory may contain computer readable code that, when executed by the processor, configure the processor to collect scan information and image information.

Also, the scan device 120 may further include an inertia measurement device (not shown) to decrease an error that may occur when scanning an inside of a facility. Once collecting of information is completed, the scan device 120 may acquire a highly accurate environment map without performing post-processing.

Figure 2:
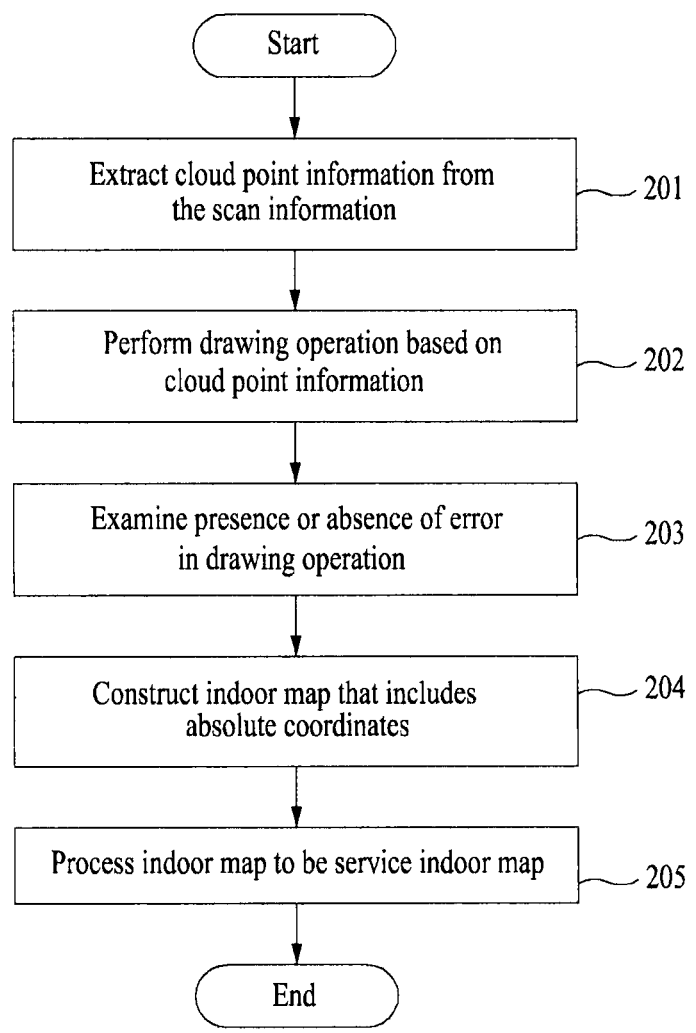
FIG. 2 is a flowchart illustrating an example of an indoor map constructing method according to at least one example embodiment.

FIG. 2 is a flowchart illustrating an example of an indoor map constructing method according to some example embodiments. The indoor map constructing method of FIG. 2 may be performed by the indoor map constructing apparatus 100 of FIG. 1 and processor 710 of FIG. 7.

In operation 201, the information extractor 111 may receive scan information and image information about each point from the scan device 120, and may extract cloud point information from the scan information. For example, the scan device 120 may collect scan information by scanning an inside of a target facility of which an indoor map is to be constructed, may collect image information about each point by photographing each point inside the target facility, and may forward the collected scan information and image information to the information extractor 111. The information extractor 111 may extract cloud point information from the forwarded scan information. Here, the cloud point information may be in a data format supported by the user, such as xyz, Laser File Format (LAS), etc., using a drawing design/creation program capable of loading cloud point information. For example, the cloud point information may include a cloud point image that is an indoor scan image representing an outline, a shape, a structure, etc., of the target facility. That is, the cloud point information may include an image representing a shape of each scanned store.

The information extractor 111 may extract a photo, a video, etc., from image information about each point.

In operation 202, the indoor map constructer 112 may perform a drawing operation on the shape of the target facility based on the cloud point information. In some example embodiments, the indoor map constructer 112 may perform the operations illustrated in FIG. 4, discussed below, to perform the drawing operation based on the cloud point information.

For example, the indoor map constructer 112 may perform a drawing operation on a shape of the target facility that includes walls, roads, outer walls of stores, etc., at a height of each point at which a cross-section of the target facility appears best, based on the cloud point information.

As an example, the indoor map constructer 112 may synthesize or filter cross-sections cut at a plurality of reference heights, for example, designated in advance. For example, a reference height may be designated in advance for each of a variety of heights, such as 30 cm, 50 cm, 1 m, etc. In this example, the indoor map constructer 112 may verify a presence of a protruding portion at a waist height, a presence of a protruding portion at an ankle height, a presence of a flowerbed at the ankle height, etc., through filtering. The indoor map constructer 112 may perform a drawing operation, such as indicating or omitting a verification result on a passage or the like.

The scan device 120 may acquire acceleration information according to a movement using an acceleration sensor when scanning the inside of the target facility while moving inside the target facility. The scan device 120 may modify a location of the scan device 120 based on the acceleration information, and may forward location error information to the indoor map constructer 112. The indoor map constructer 112 may correct an error in a drawing operation performed on the inside of the target facility according to a minute shaking or movement of the scan device 120 by applying a travel distance corresponding to the error to the drawing operation based on error information.

In operation 203, the indoor map constructer 112 may examine a presence or absence of an error in the drawing operation performed on the inside of the target facility using a desired (or, alternatively, a predefined)structured query language (SQL) function.

In some example embodiments, the indoor map constructer 112 may perform an error examination on the drawing operation for each floor of the target facility. In other example embodiments, the indoor map constructer 112 may perform the error examination on the drawing operation at a same time with respect to all of the floors of the target facility.

As an example, when performing the examination for each floor, the indoor map constructer 112 may perform the examination for each floor by performing an examination on a subsequent floor once the examination of the drawing operation is completed on a single floor. For example, the indoor map constructer 112 may receive an identifier(ID) of a target building to be examined and an ID of a floor to be examined by executing a query text stored in advance in a database. The indoor map constructer 112 may examine a presence or absence of an error in a drawing operation on a corresponding floor of a corresponding building.

In this example, once the error is verified to be present in the drawing operation through the examination, the indoor map constructer 112 may automatically correct the error of the drawing operation based on attribute information and image information about each point inside the target facility.

In operation 204, the indoor map constructer 112 may construct the indoor map that includes absolute coordinates through georeferencing.

For example, the indoor map constructer 112 may construct the indoor map that includes absolute coordinates by performing an error examination and correction on a drawing operation and by mapping a longitude and latitude of each point inside the target facility on the indoor map that is constructed through georeferencing. The indoor map constructed through georeferencing as above may have the same coordinate system as a longitude/latitude-based coordinate system of a map used in daily lives.

Accordingly, the indoor map constructer 112 may provide the indoor map including absolute coordinates to the mobile terminal 110 in interaction with an outdoor map. Here, the outdoor map may indicate a map having the same coordinate system as the constructed indoor map including the absolute coordinates.

In operation 205, the indoor map constructer 112 may process the indoor map constructed through georeferencing to be an image-based service indoor map. The indoor map constructer 112 may process the indoor map in order to provide a uniform indoor view service by designating a difference color for each point inside the target facility.

For example, the indoor map constructer 112 may process the indoor map so that a convenient store among stores positioned within the target facility may be displayed in pink. That is, all the convenient stores for each floor on the service indoor map for the target facility may be designated and thereby displayed to be in pink. Accordingly, a uniform indoor view service may be provided.

Although an example embodiment in which the scan device 120 scans the inside of the target facility and the indoor map constructing apparatus 100 performs a drawing operation of drawing a line based on scan information is described with reference to FIG. 2, example embodiments are not limited thereto. In addition, the scan device 120 may perform scanning and a simple drawing operation, and the indoor map constructing apparatus 100 may perform an additional drawing operation.

For example, the scan device 120 may complete in advance an indoor map that connects inner walls of the target facility scanned through filtering processing, with lines. That is, the scan device 120 may perform a primary drawing operation of drawing the outline of places distinguished from each other with walls, for example, stores, a toilet, etc., inside the target facility. The indoor map constructing apparatus 100 may receive, from the scan device 120, the indoor map of which the primary drawing operation is performed and may perform a further detail additional drawing operation. In an example in which the scan device 120 completes the indoor map in advance by performing filtering processing based on a motion of a person, the indoor map constructer 112 may perform a secondary drawing operation of adding a protruding portion, a flowerbed, etc., on the completed indoor map.

In this instance, when scanning the inside of the target facility while moving inside the target facility, the scan device 120 may acquire acceleration information according to a movement using an acceleration sensor. The scan device 120 may perform the drawing operation by reconfirming a location of the scan device 120 based on the acceleration information and by modifying walls capable of being represented to be curved. For example, the scan device 120 may scan the inside of the target facility by moving with shaking slightly side to side, instead of steadily moving straight. Through this, the walls may be represented to be curved. Here, acceleration information according to a movement of the scan device 120 may be acquired using an acceleration sensor provided to the scan device 120. The scan device 120 may determine whether a current location of the scan device 120 has moved minutely side to side based on orientation information included in the acceleration information. The scan device 120 may correct a drawing error by a minute shaking or movement by applying a determined travel distance to the drawing operation.

Figure 3:
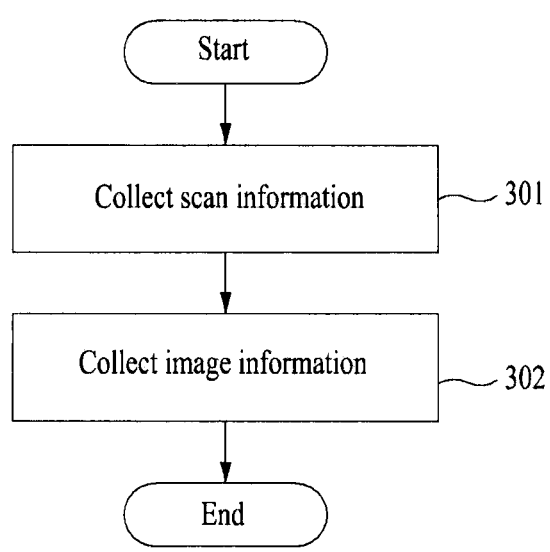
FIG. 3 is a flowchart illustrating an example of collecting scan information and image information by scanning an inside of a target facility according to at least one example embodiment.

FIG. 3 is a flowchart illustrating an example of collecting scan information and image information by scanning an inside of a target facility according to some example embodiments. The method of collecting scan information and image information of FIG. 3 may be performed by the scan device 120 of FIG. 1.

In operation 301, the scan device 120 may collect scan information about each point inside a target facility using, for example, a three-dimensional (3D) laser scanner (not shown).

For example, the scan device 120 may scan an internal structure of the target facility while moving inside the target facility using the 3D laser scanner. Here, the scan device 120 may perform scanning for each point positioned within the target facility.

For example, a single engineer treating the scan device 120 may scan the inside of the target facility by moving the scan device 120. The scan device 120 may scan stores, medical treatment items, company departments, etc., positioned within the target facility.

As described above, the scan device 120 may collect scan information about each point inside the target facility by scanning the inside of the target facility using the 3D laser scanner. Here, the scan information may include cloud point information about each point.

For example, the cloud point information may include a cloud point image that is an indoor scan image representing an outline, a shape, a structure, etc., of the target facility. That is, the cloud point information may include an image that represents a shape of each scanned store.

In operation 302, the scan device 120 may collect image information about each point inside the target facility using a camera.

For example, the scan device 120 may collect image information about each point of the target facility while moving inside the target facility using a panorama camera (not shown). For example, the scan device 120 may collect image information corresponding to a point at which scan information is collected by capturing a panorama image at the point at which the scan information is collected using the 3D laser scanner. In this instance, the scan device 120 may capture a panorama image at desired (or, alternatively, at preset) intervals for an indoor view service.

The scan device 120 may also photograph an environment around each point, for example, a vending machine, a dust bin, a newsstand, a signboard, an interior item, etc., positioned around each point. An image of a surrounding environment may be utilized to provide a peripheral image of a point of interest (POI) together with the POI in response to a request from the mobile terminal 110 for information about the POI.

Only with scanning and photographing the inside of the target facility while moving inside the target facility, the scan device 120 may collect scan information and image information about each point inside the target facility. Accordingly, compared to an example in which a plurality of users collects information about the target facility by visiting here and there inside the target facility to construct a measurement-based indoor map, highly accurate and uniform quality data may be collected. Therefore, in one or more example embodiments, a single scan device 120 or a plurality of coordinated (or, alternatively, synchronized) scan devices 120 may collect coordinated scan and image information.

Also, since information about a route through which the scan device 120 has passed to collect data is collected, it is possible to further accurately apply an indoor passage through which a person is movable to a drawing operation based on the collected information about the route.

Figure 4:
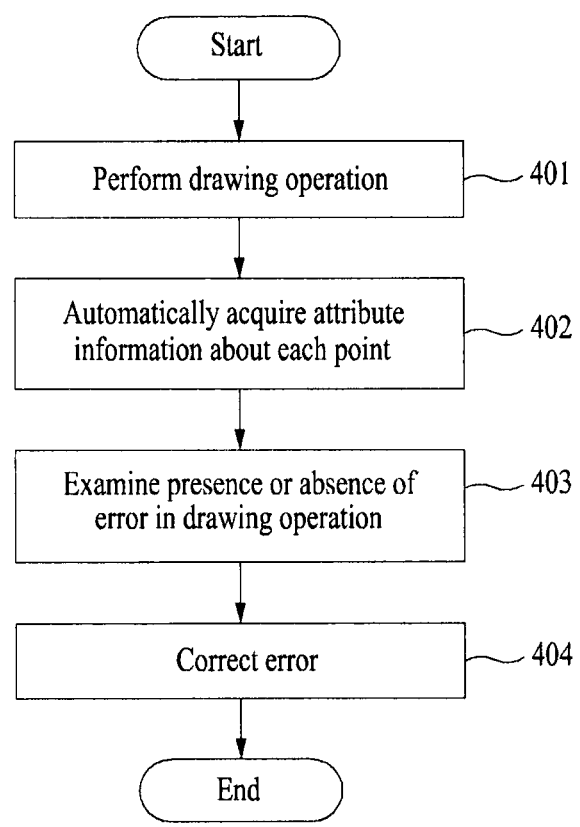
FIG. 4 is a flowchart illustrating a detailed example of performing a drawing operation based on cloud point information according to at least one example embodiment.

FIG. 4 is a flowchart illustrating a detailed example of performing a drawing operation based on cloud point information according to some example embodiments. The method of performing a drawing operation, examining an error in the drawing operation, and correcting the error of FIG. 4 may be performed by the indoor map constructing apparatus 100 of FIG. 1.

In operation 401, the indoor map constructer 112 may perform a drawing operation on a shape of a target facility based on cloud point information.

For example, the indoor map constructer 112 may load cloud point information about each point using a drawing design/creation program capable of loading cloud point information, and may perform a drawing operation on a shape of the target facility that includes an inner wall, road, and/or an outline of a store inside the target facility based on the loaded cloud point information.

In operation 402, with performing the drawing operation, the indoor map constructer 112 may display a peripheral image at a specific point to a user, in response to a selection on the specific point indoors using a location-image mapping plug-in. Attribute information about each point inside the target facility may be automatically acquired. An example of automatically acquiring attribute information is discussed in more detail with regards to FIG. 5, discussed below.

For example, the indoor map constructer 112 may automatically acquire attribute information about the specific point from image information about the specific point. In the case of a facility that includes content of which attribute information is acquirable at a specific location, for example, a store, a leased office, etc., the attribute information may be preset to be acquired from a specific area of a corresponding facility image. In response to a selection on a specific point, attribute information may be automatically acquired by performing optical character recognition (OCR) to recognize characters of a specific area in the corresponding image information. Here, the attribute information may include a name, a telephone number, an address, etc., of each point. The indoor map constructer 112 may store and manage the acquired attribute information about each point in a database (not shown).

Here, the indoor map constructer 112 may map attribute information to space information about each point and may store the mapped information in the database (not shown). For example, the indoor map constructer 112 may generate space information of an image form based on scan information, cloud point information, image information, and acceleration information by driving a robot operating system (ROS). The indoor map constructer 112 may construct the indoor map of the target facility by mapping attribute information to the generated space information.

Once the indoor map of the target facility is constructed, the indoor map constructer 112 may provide an image captured at a POI to the mobile terminal 110 through an image viewer.

In operation 403, the indoor map constructer 112 may examine whether the drawing operation on the target facility is accurately performed using a desired (or, alternatively, a predefined) SQL function.

Here, the indoor map constructer 112 may perform an attribute information examine and a road examination on the target facility of which the drawing operation is performed. Each of the attribute information examination and the road examination may be performed for each floor inside the target facility and may also be performed at a time with respect to all of the floors inside the target facility.

In an example of performing the attribute information examination, the indoor map constructer 112 may examine whether attribute information about each point inside the target facility of which the drawing operation is performed has been accurately mapped using a predefined attribute SQL function. For example, the indoor map constructer 112 may examine whether attribute information about a store, such as a door of the store, a corridor of the store, an address, a telephone number, and a name of the store, etc., is accurately mapped to the store. In this example, when data has a first value, for example a "1" value, in a store field of query attribute information, the indoor map constructer 112 may verify the door of the store.

Also, when data as a second value, for example, a "2" value in the store field, the indoor map constructer 112 may verify through the attribute information examination that an error has occurred in the drawing operation due to inaccurate mapping of the door of the store.

Further, the indoor map constructer 112 may verify whether a form of a value about a specific field does not match or whether content is absent in the specific field.

In an example of examining the road examination, the indoor map constructer 112 may examine whether a drawing operation on roads such as a path, a passage, a corridor, etc., inside the target facility has been accurately performed using a road SQL function defined (or, alternatively, predefined) for the road examination. That is, the indoor map constructer 112 may examine whether roads, such as a route, a corridor, etc., has been accurately drawn on the indoor map constructed through the drawing operation.

For example, when examining whether a corridor of the store positioned in front of the store has been accurately drawn, the indoor map constructer 112 may examine the corridor of the store using location coordinates corresponding to both end points of the corridor of the store. To this end, the indoor map constructer 112 may examine a road of the store based on whether intermediate point coordinates of the corridor, calculated based on location coordinates corresponding to a left end point of the corridor of the store, match intermediate point coordinates of the corridor calculated based on location coordinates corresponding to a right end point of the corridor of the store.

When the intermediate point coordinates based on the left end point match the intermediate point coordinates based on the right end point, the indoor map constructer 112 may determine that the drawing operation has been performed without causing an error. On the contrary, when the intermediate point coordinates based on the left end point mismatch, that is, differ from the intermediate point coordinates based on the right end point, the indoor map constructer 112 may determine that an error has occurred in the drawing operation performed on the corridor of the store.

Further, the indoor map constructer 112 may also examine whether there is any disconnected portion in a line representing, for example, a path, a corridor, etc.

In operation 404, the indoor map constructer 112 may correct the error of the drawing operation verified during examining the drawing operation. Here, the indoor map constructer 112 may correct the error based on cloud point information, image information, and/or attribute information about a point at which the error is verified.

In an example in which an error is verified to have occurred in the drawing operation due to data having the second value (e.g., a value of "2") being included in the store field and inaccurate mapping of the door of the store at the attribute information examination, the indoor map constructer 112 may correct the verified error of the drawing operation by mapping a door corresponding to attribute information including data having the first value (e.g., a value of "1") in the store field, to the store, based on image information and attribute information about the store.

In an example in which intermediate point coordinates about both ends of the corridor of the store differ from each other at the road examination, the indoor map constructer 112 may determine that the error has occurred in the drawing operation performed on the corridor of the store and may correct the error. For example, when the corridor of the store is drawn to be disconnected at the drawing operation, the indoor map constructer 112 may correct the error having occurred in drawing the corridor of the store to match a picture in which the corridor of the store is drawn to be seamless, based on image information about the corridor of the store.

Figure 5:
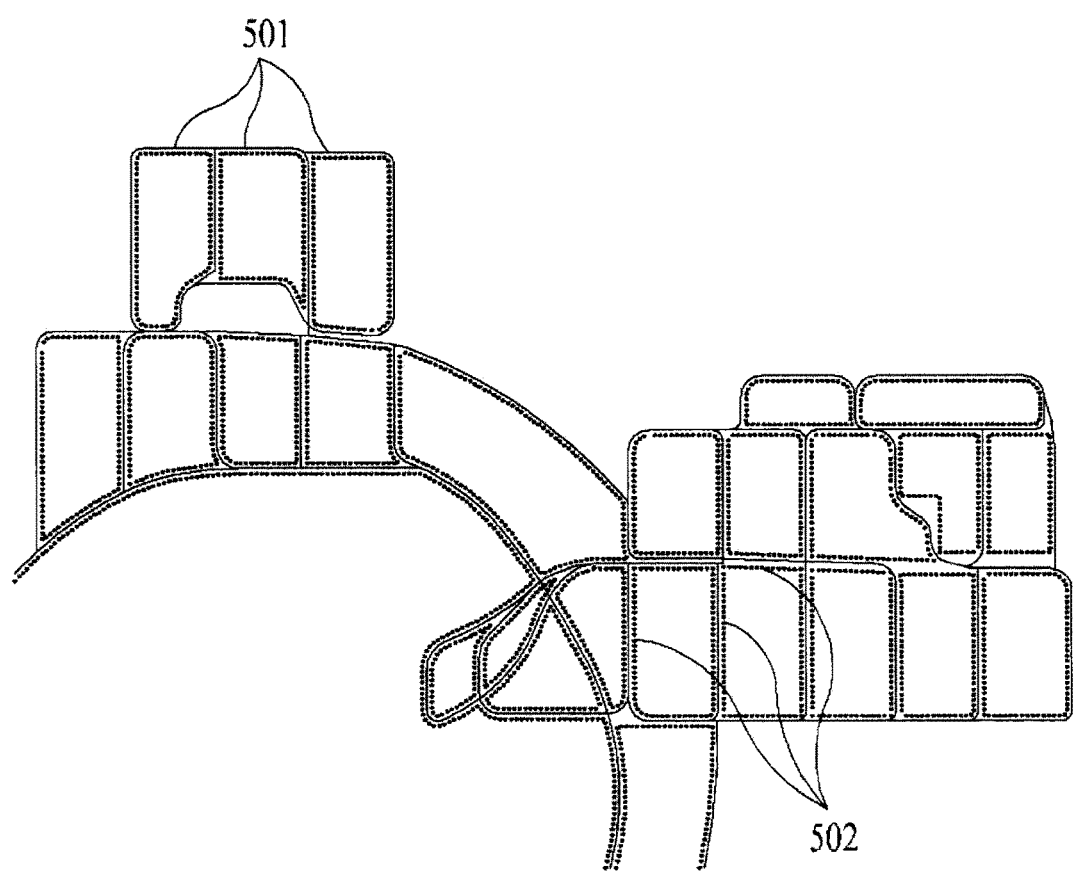
FIG. 5 illustrates an example provided to describe an operation of automatically acquiring attribute information about each point using a location-image mapping plug-in according to at least one example embodiment.

FIG. 5 illustrates an example provided to describe an operation of automatically acquiring attribute information about each point using a location-image mapping plug-in according to some example embodiments.

Referring to FIG. 5, a portion 501 indicated with solid lines denotes an inner wall of a target facility and a portion 502 indicated with dotted lines inside the solid lines denotes a location of each point captured by a camera.

For example, an indoor scan screen inside the target facility of FIG. 5 may be loaded using AutoCAD and the like. Here, when a POI is selected on the indoor scan screen, the indoor map constructing apparatus 100 may load image information corresponding to the selected POI.

For example, when a single circle is selected as a POI on the loaded indoor scan screen of FIG. 5, the indoor map-constructing apparatus 100 may load image information captured at the selected POI through an external image viewer. The indoor map constructing apparatus 100 may acquire attribute information of the POI from the loaded image information.

Using the same method, the indoor map constructing apparatus 100 may acquire attribute information about all of the points inside the target facility. That is, the indoor map constructing apparatus 100 may acquire attribute information of each circle, for example, the portion 502, indicated vaguely with points inside a solid line that indicates a wall on the indoor scan screen of FIG. 5.

Figure 6:
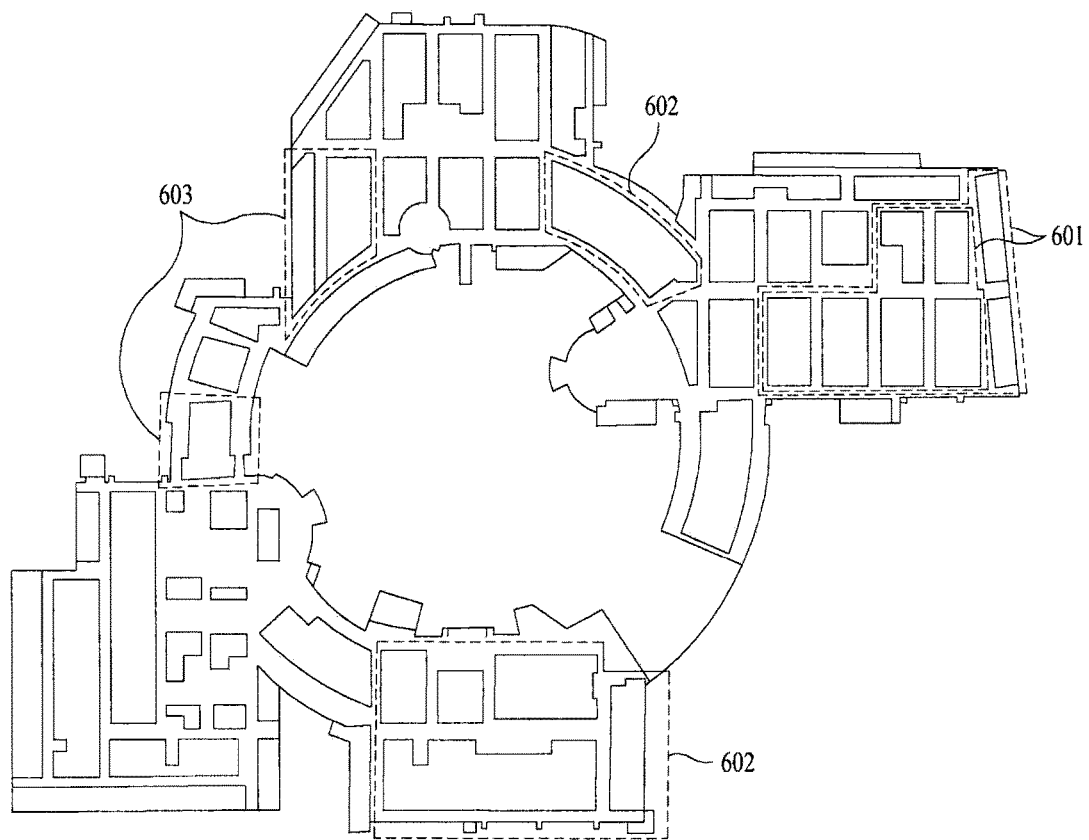
FIG. 6 illustrates an example of a service indoor map according to at least one example embodiment.

FIG. 6 illustrates an example of a service indoor map according to some example embodiments.

Hereinafter, an operation of the indoor map constructing apparatus 100 that processes an indoor map and provides a service indoor map in order to provide a uniform indoor view service will be described with reference to FIG. 6.

For example, the indoor map constructing apparatus 100 may designate a first color (e.g., yellow) to a first type of service providers 601 (e.g. clothing stores), a second color (e.g., light green) to a second type of service providers 602(e.g., furniture stores), and a third color (e.g., sky blue) to a third type of service providers 603 (e.g., sports stores) among points positioned within a target facility to provide a uniform indoor view service. In this example, the indoor map constructing apparatus 100 may generate a service indoor map by processing an indoor map so that a color designated for each point may be displayed.

The indoor map constructing apparatus 100 may provide the service indoor map to the mobile terminal 110 of the user. Referring to FIG. 6, the service indoor map in which the clothing stores 601, the furniture stores 602, and the sports stores 603 may be displayed on the mobile terminal 110 such that each of the types of service providers are displayed in a different color.

Although an example embodiment of processing the indoor map by designating a different color for each point in order to provide the uniform indoor view service is described with reference to FIG. 6, it is only an example. The indoor map constructing apparatus 100 may process the indoor map using a variety of methods to distinguish a restaurant, a clothing store, a pharmacy, a mart, etc., from one another based on a category of each point. For example, the indoor map constructing apparatus 100 may also process the indoor map by designating a different pattern for each point.

Figure 7:
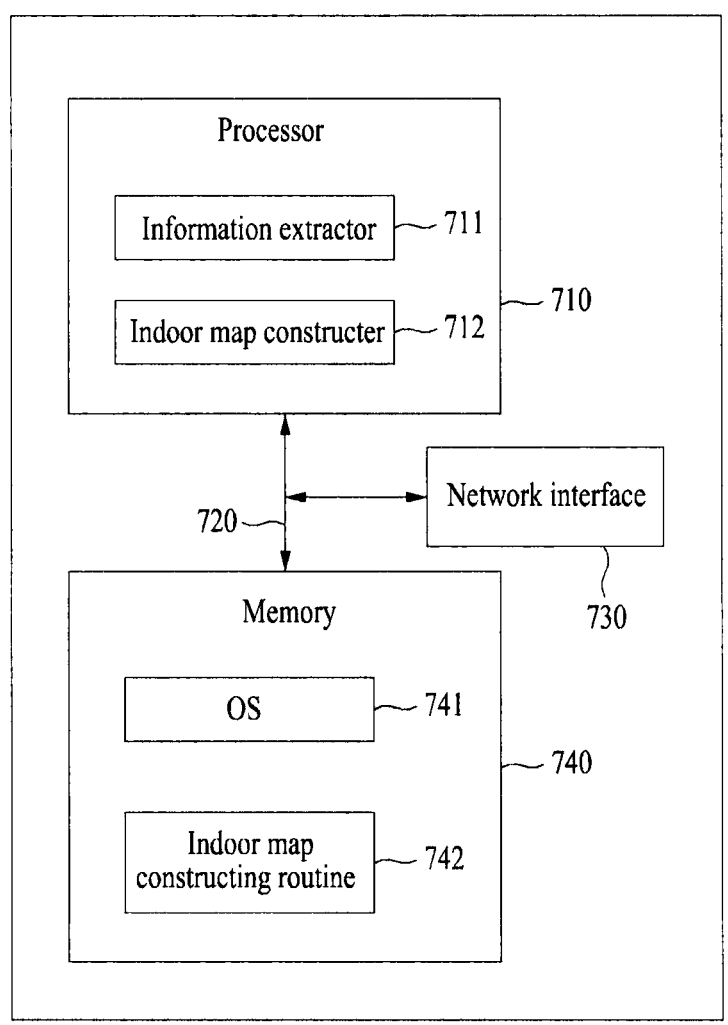
FIG. 7 is a block diagram illustrating an example of a configuration of an indoor map constructing apparatus according to at least one example embodiment.

FIG. 7 is a block diagram illustrating an example of a configuration of an indoor map constructing apparatus according to some example embodiments.

Referring to FIGS. 1 and 7, the indoor map constructing apparatus 700 may include a processor 710, a bus 720, a network interface 730, and a memory 740. The memory 740 may include an operating system (OS) 741 and an indoor map constructing routine 742.

The indoor map constructing routine 742, when executed by the processor 710, may configure the processor 710 as an information extractor 711 and an indoor map constructer 712. Here, the information extractor 711 and the indoor map constructer 712 may correspond to an information extractor 111 and an indoor map constructer of FIG. 1. Therefore, operations of FIG. 2 may be performed by the information extractor 711 and the indoor map constructer 712.

The processor 710 may be configured to process computer-readable instructions by performing a basic operation, a logic arithmetic operation, and an input/output operation of the indoor map constructing apparatus 700. The processor 710 may be configured to execute program codes or instructions for the information extractor 711 and the indoor map constructer 712. The program codes may be stored in a storage device such as the memory 740.

The memory 740 may include a permanent mass storage device, such as a random access memory (RAM), a read only memory (ROM), and a disc drive, as a computer-readable storage medium. Also, program codes for the OS 741 and the indoor map constructing routine 742 may be stored in the memory 740. Such software constituent elements may be loaded from another computer-readable storage medium separate from the memory 740 using a drive mechanism (not shown). The other computer-readable storage medium may include, for example, a floppy drive, a disc, a tape, a DVD/CD-ROM drive, a memory card, etc. Software constituent elements may be loaded to the memory 740 through the network interface 730 instead of using the computer-readable storage medium.

The bus 720 enables communication and data transmission between the constituent elements of the indoor map constructing apparatus 100. The bus 720 may be configured using a high-speed serial bus, a parallel bus, a storage area network (SAN), and/or another appropriate communication technology.

The network interface 730 may be a computer hardware constituent element for connecting the indoor map constructing apparatus 100 to the computer network. The network interface 730 may connect the indoor map constructing apparatus 100 to the computer network through a wireless or wired connection.

The information extractor 711and the indoor map constructer 712 may be configured to construct the indoor map based on scan information and image information about each point inside the target facility collected by the scan device 120.

The scan device 120 may collect scan information by scanning the inside of the target facility of which the indoor map is to be constructed, and may transmit the collected scan information to the indoor map constructing apparatus 700.

The information extractor 711 may receive the scan information and the image information about each point inside the target facility, and may extract a format available by a user, for example, a format available by the mobile terminal 110.

For example, the information extractor 711 may extract cloud point information about each point from scan information. In this instance, the information extractor 711 may extract the cloud point information as a format such as xyz, las, etc., which are commonly used. Here, the cloud point information may include a cloud point image that is an indoor scan image representing an outline, a shape, a structure, etc., of the target facility. That is, the cloud point information may include an image representing a shape of each scanned store.

The information extractor 711 may extract a photo, a video, etc., from image information about each point.

The indoor map constructer 712 may construct the indoor map of the target facility based on the extracted cloud point information and image information. To this end, the indoor map constructer 712 may perform a drawing operation on the inside of the target facility based on the cloud point information about each point, and may automatically acquire attribute information about each point based on the image information.

For example, the indoor map constructer 712 may load cloud point information about each point using AutoCAD and the like, and may perform a drawing operation on a shape of the target facility that includes walls, roads, outer walls of stores, etc., at a height of each point at which a cross-section of the target facility appears best, based on the loaded cloud point information.

The indoor map constructer 712 may acquire attribute information about each point from image information about each point using a location-image mapping plug-in. Here, the attribute information may include a name, a telephone number, an address, etc., of each point.

For example, when an address, a name, a telephone number, etc., of a POI are captured and included in a photo, a video, etc., of the POI, the indoor map constructer 712 may acquire attribute information, such as the name, the telephone number, the address, etc., of the POI, from image information of the POI using the location-image mapping plug-in.

Using the same method, the indoor map constructer 712 may acquire attribute information about each point inside the target facility using the location-image mapping plug-in. As described above, since the indoor map constructer 712 uses the plug-in, the indoor map constructer 712 may automatically acquire attribute information about each point although a plurality of users does not directly input attribute information corresponding to each point. The indoor map constructer 712 may store and maintain the acquired attribute information in a database (not shown).

The indoor map constructer 712 may construct the indoor map of the target facility by mapping the acquired attribute information to space information about the target facility. As described above, since the attribute information is mapped to the space information, the indoor map constructer 712 may provide an image captured at a POI to the mobile terminal 110 through an image viewer in response to an input or a selection on the POI from the mobile terminal 110.

Here, the indoor map constructer 712 may examine whether a drawing operation on the target facility is accurately performed. The indoor map constructer 712 may examine whether an error is present in the drawing operation using a predefined SQL function. For example, the indoor map constructer 712 may perform an attribute information examination, a road examination, and the like. Here, the indoor map constructer 712 may also examine a drawing error at a time with respect to all of the floors of the target facility. Additionally, the indoor map constructer 712 may examine the drawing error for each floor of the target facility.

When the error is verified to be present in the drawing operation, the indoor map constructer 712 may automatically correct the verified error based on image information, attribute information, and cloud point information about each point. Here, a method of examining, by the indoor map constructer 712, an error in a drawing operation performed on the indoor map of the target facility and correcting the error is described above with reference to FIG. 4 and thus, a further description will be omitted here.

When the error examination and correction on the drawing operation is completed, the indoor map constructer 712 may construct the indoor map that includes absolute coordinates about the inside of the target facility.

For example, the indoor map constructer 712 may construct the indoor map that includes absolute coordinates by mapping a longitude and a latitude of each point inside the target facility to the indoor map that is constructed through georeferencing. The indoor map constructed through georeferencing as above may have the same coordinate system as a longitude/latitude-based coordinate system of a map used in daily lives.

The indoor map constructer 712 may process the indoor map constructed through georeferencing to be an image-based service indoor map. The indoor map constructer 712 may process the indoor map in order to provide a uniform indoor view service by designating a different color for each point inside the target facility. Here, a method of processing the service indoor map is described with reference to FIG. 6 and thus, a further description will be omitted here.

Although an example embodiment in which the scan device 120 scans the inside of the target facility and the indoor map constructing apparatus 100constructs the indoor map of the target facility is described above with reference to FIGS. 1 through 7, it is only an example. The indoor map constructing apparatus 100 may perform all of scan and indoor map constructing operations.

Figure 8:
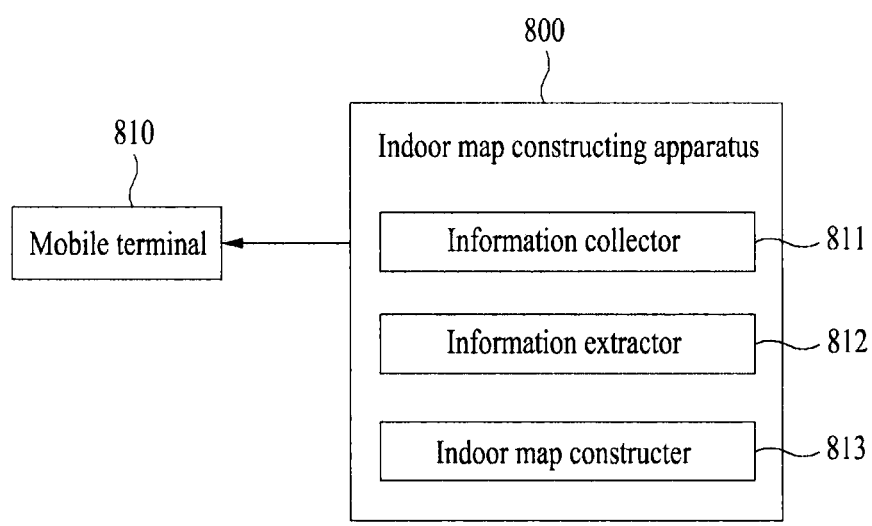
FIG. 8 is a block diagram illustrating another example of an indoor map constructing apparatus according to at least one example embodiment.

FIG. 8 is a block diagram another example of a configuration of an indoor map constructing apparatus according to some example embodiments.

FIG. 8 illustrates a mobile terminal 810 of a user and an indoor map constructing apparatus 800.

In FIG. 8, the indoor map constructing apparatus 800 is provided as a single apparatus by combining the indoor map constructing apparatus 100 and the scan device 120 of FIG. 1. An operation of the mobile terminal 810 of FIG. 8 is substantially the same as an operation of the mobile terminal 110 of FIG. 1 and thus, a further description will be omitted here.

The indoor map constructing apparatus 800 may include an information collector 811, an information extractor 812, and an indoor map constructer 813 to provide a service indoor map to the mobile terminal 110.

The information collector 811 may scan the inside of the target facility using a 3D laser scanner, a camera, etc., and accordingly collect scan information about each point and image information about each point. The information collector 811 may include a 3D laser scanner and/or a panoramic camera.

The information extractor 812 may extract cloud point information about each point from the scan information, and may extract a photo, a video, etc., from the image information. That is, the information extractor 812 may extract information of a format available by a user from the scan information and the image information.

The indoor map constructer 813 may construct the indoor map of the target facility based on the cloud point information and the image information. The indoor map constructer 813 may provide a service indoor map by processing the constructed indoor map.

Figure 9:
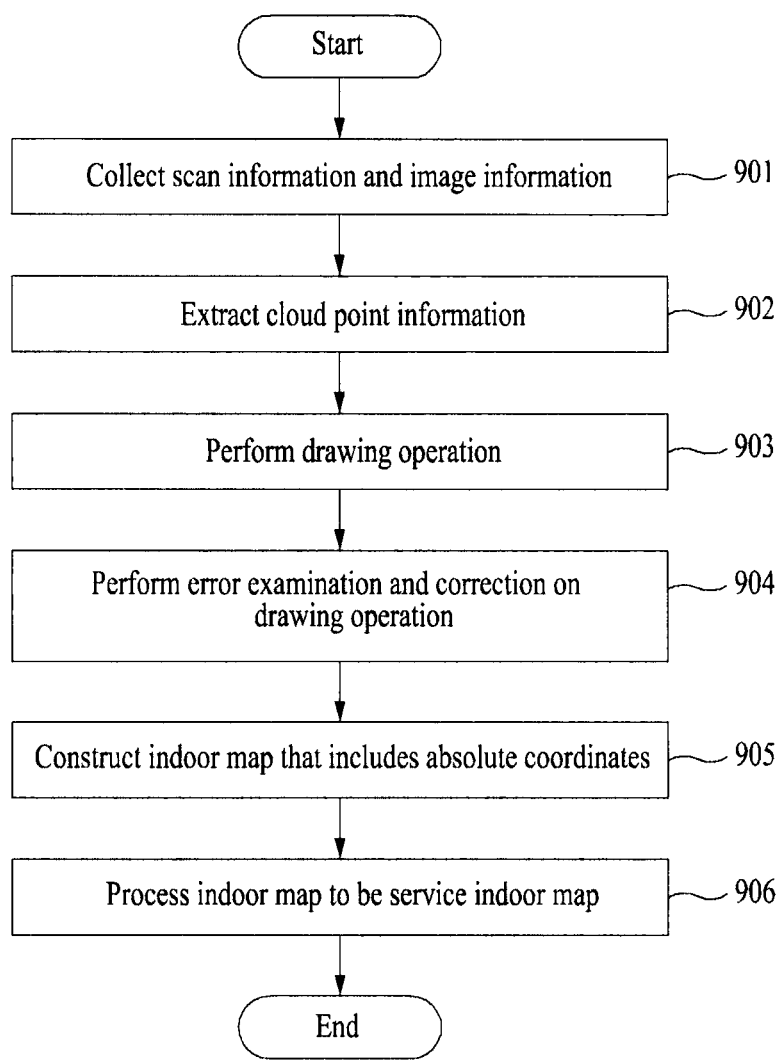
FIG. 9 is a flowchart illustrating another example of an indoor map constructing method according to at least one example embodiment.

FIG. 9 is a flowchart illustrating another example of an indoor map constructing method according to some example embodiments. The indoor map constructing method of FIG. 9 may be performed by the indoor map constructing apparatus 800 described with FIGS. 8 and 10.

Figure 10:
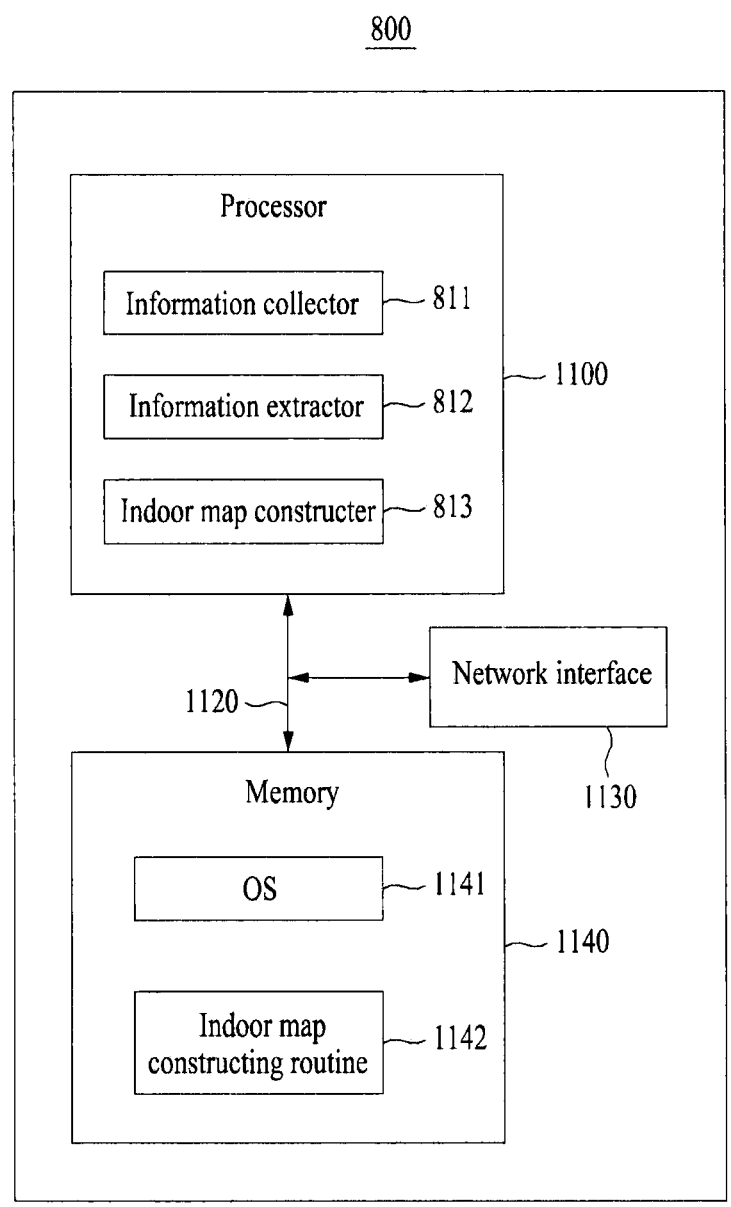
FIG. 10 is a block diagram illustrating another example of a configuration of an indoor map constructing apparatus according to at least one example embodiment It should be noted that these figures are intended to illustrate the general characteristics of methods and/or structure utilized in certain example embodiments and to supplement the written description provided below. These drawings are not, however, to scale and may not precisely reflect the precise structural or performance characteristics of any given embodiment, and should not be interpreted as defining or limiting the range of values or properties encompassed by example embodiments.

FIG. 10 is a block diagram illustrating another example of a configuration of an indoor map constructing apparatus according to some example embodiments.

Referring to FIG. 10, the indoor map constructing apparatus 800 may include a processor 1110, a bus 1120, a network interface 1130, and a memory 1140. The memory 1140 may include an OS 1141 and an indoor map constructing routine 1142. The processor 1110 may include an information collector 1111, an information extractor 1112, and an indoor map constructer 1113.

Operations of the processor 1110, the bus 1120, the network interface 1130, and the memory 1140 of FIG. 10 are similar to operations of the processor 710, the bus 720, the network interface 730, and the memory 740 of FIG. 7 and thus, a further description will be omitted here.

In operation 901, the information collector 811 may collect scan information by scanning the inside of the target facility of which the indoor map is to be constructed.

Here, the information collector 811 may collect scan information about each point by scanning each point inside the target facility using a 3D laser scanner. The information collector 811 may collect image information about each point by photographing each point inside the target facility using a camera.

In operation 902, the information extractor 812 may extract cloud point information about each point from the scan information, and may extract a photo, a video, etc., from the image information.

Here, the cloud point information, as a format available by the user, may be extracted from the scan information to be in a form of xyz, las, etc. For example, the cloud point information may include a cloud point image that is an indoor scan image representing an outline, a shape, a structure, etc., of the target facility.

In operation 903, the indoor map constructer 813 may perform a drawing operation on the shape of the target facility based on the cloud point information.

For example, the indoor map constructer 813 may perform a drawing operation on the shape of the target facility that includes walls, roads, outer walls of stores, etc., at a height of each point at which a cross-section of the target facility appears best, based on the cloud point information.

As an example, the indoor map constructer 813 may synthesize or filter cross-sections cut at a plurality of reference heights designated in advance. For example, a reference height may be designated in advance for each of a variety of heights, such as 30 cm, 50 cm, 1 m, etc. In this example, the indoor map constructer 813 may verify a presence of a protruding portion at a waist height, a presence of a protruding portion at an ankle height, a presence of a flowerbed at the ankle height, etc., through filtering. The indoor map constructer 813 may perform a drawing operation, such as indicating or omitting a verification result on a passage or the like.

The information collector 811 may acquire acceleration information according to a movement using an acceleration sensor when scanning the inside of the target facility while moving inside the target facility. The indoor map constructer 112 may correct an error in the drawing operation performed on the inside of the target facility according to a minute shaking or movement occurring when scanning the inside of the target facility by modifying a location of the indoor map constructer 813 based on the acceleration information and by applying a travel distance corresponding to the error to the drawing operation based on error information.

In operation 904, the indoor map constructer 813 may examine a presence or absence of an error in the drawing operation performed on the inside of the target facility using a predefined SQL function.

The indoor map constructer 813 may perform an error examination on the drawing operation for each floor of the target facility and may also perform the error examination on the drawing operation at a time with respect to all of the floors of the target facility. For example, the indoor map constructer 813 may perform an attribute information examination, a road examination, and the like, with respect to the target facility.

In this example, once the error is verified to be present in the drawing operation through the examination, the indoor map constructer 813 may automatically correct the error of the drawing operation by referring to the database (not shown) in which attribute information about each point inside the target facility and space information about the inside of the target information are mapped and stored.

In operation 905, the indoor map constructer 813 may construct the indoor map that includes absolute coordinates through georeferencing.

For example, when the error examination and modification on the drawing operation is completed, the indoor map constructer 813 may map a longitude and a latitude of each point inside the target facility to the indoor map that is constructed through georeferencing. Through such mapping, the indoor map constructer 813 may construct the indoor map that includes absolute coordinates.

Here, the indoor map that includes the absolute coordinates may have the same coordinate system as a longitude/latitude-based coordinate system of a map used in daily lives. Accordingly, the indoor map constructer 813 may enable interaction between the indoor map that includes absolute coordinates and an outdoor map.

In operation 906, the indoor map constructer 813 may process the indoor map constructed through georeferencing to be an image-based service indoor map. The indoor map constructer 813 may also process the indoor map in order to provide a uniform indoor view service by designating a different color for each point inside the target facility.

As described above, the indoor map constructing apparatus 800 may automatically acquire attribute information about each point using a location-image plug-in and may examine and automatically correct an error of a drawing operation using a defined (or, alternatively, a predefined) SQL function. Accordingly, it may be possible to decrease the inconvenience arising from visiting the target facility several times to acquire information associated with an outline of the target facility and the target facility. Further, it is possible to reduce the number of persons used to construct the indoor map.

Also, by performing the error examination and correction on the drawing operation, it may be possible to further quickly and accurately construct the indoor map of the target facility. In addition, even persons without skilled knowledge about the drawing operation may construct the indoor map through simple education.

Although it is described that an indoor map constructing apparatus provides a service indoor map to a mobile terminal by processing an indoor map, it is only an example. The indoor map constructing apparatus may provide the service indoor map to a desktop, a notebook, a web book, and another server, in addition to the mobile terminal.

The methods according to the example embodiments may be recorded in non-transitory computer-readable media including program instructions to implement various operations embodied by a computer. The media may also include, alone or in combination with the program instructions, data files, data structures, and the like. The program instructions stored in the media may be those specially designed and constructed for the purposes, or they may be of the kind well-known and available to those having skill in the computer software arts. Examples of non-transitory computer-readable media include magnetic media such as hard disks, floppy disks, and magnetic tape; optical media such as CD ROM disks and DVD; magneto-optical media such as floptical disks; and hardware devices that are specially to store and perform program instructions, such as read-only memory (ROM), random access memory (RAM), flash memory, and the like. Examples of program instructions include both machine code, such as produced by a compiler, and files containing greater level code that may be executed by the computer using an interpreter. The described hardware devices may be to act as one or more software modules in order to perform the operations of the above-described embodiments.

Although the example embodiments are described with reference to limited example embodiments and drawings, it will be apparent to those skilled in the art that various modifications and variation can be made in the example embodiments without departing from the spirit or scope of the example embodiments. For example, although the aforementioned technologies may be performed in order different from the described methods and/or constituent components such as the systems, structures, apparatus, circuits, etc., may be coupled or combined in a form different from the described methods or may be replaced with or substituted with the other constituent components or equivalents, appropriate results may be achieved.

Thus, it is intended that the example embodiments cover the modifications and variations provided they come within the scope of the appended claims and their equivalents.

What is claimed is:

1. An apparatus configured to construct an indoor map, the apparatus comprising:
   a processor configured to,
     extract cloud point information from scan information associated with points inside a target facility,
     construct the indoor map of the target facility based on the cloud point information by,
       acquiring attribute information associated with each of the points, the attribute information including at least one of (i) numerical or textual data, or (ii) a determined structure,
       performing a drawing operation based on the cloud point information,
       mapping the attribute information to space information associated with the target facility to construct the indoor map, and
       determine whether the drawing operation contains errors by detecting whether the attribute information in the indoor map is at least one of (i) incorrect or (ii) missing.

2. The apparatus of claim 1, wherein the processor is further configured to perform the drawing operation on a shape of the target facility by synthesizing or filtering a cross-section of the target facility at each of the points based on the cloud point information.

3. The apparatus of claim 2, wherein the processor is further configured to determine whether the drawing operation contains errors using a structured query language (SQL) function.

4. The apparatus of claim 3, wherein the processor is further configured to automatically correct the errors in the drawing operation based on attribute information and image information associated with the points inside the target facility.

5. The apparatus of claim 1, wherein the processor is configured to construct the indoor map such that the indoor map maps an inside of the target facility to an absolute coordinate system.

6. The apparatus of claim 1, wherein the processor is configured to construct the indoor map such that the indoor map has a same coordinate system as an outdoor map of an area outside the target facility.

7. The apparatus of claim 1, wherein the processor is further configured to process the indoor map to designate a different color to the points inside the target facility, each color corresponding to a different category of destination.

8. The apparatus of claim 1, wherein
   the apparatus is configured to receive the scan information from a scan device configured to scan the points inside the target facility, and
   the processor is further configured to correct a drawing error based on acceleration information associated with the scan device.

9. A method of constructing an indoor map of a target facility, the method comprising:
   extracting cloud point information from scan information associated with points inside the target facility;
   constructing the indoor map of the target facility based on the cloud point information by,
     acquiring attribute information associated with each of the points, the attribute information including at least one of (i) numerical or textual data, or (ii) a determined structure,
     performing a drawing operation based on the cloud point information,
     mapping the attribute information to space information associated with the target facility to construct the indoor map, and
     determining whether the drawing operation contains errors by detecting whether the attribute information in the indoor map is at least one of (i) incorrect or (ii) missing.

10. The method of claim 9, wherein the
    performing includes performing the drawing operation on a shape of the target facility based on the cloud point information.

11. The method of claim 10, wherein the
    performing includes performing the drawing operation on the shape of the target facility by synthesizing or filtering a cross-section of the target facility at each point based on the cloud point information.

12. The method of claim 10, wherein the determining whether the drawing operation contains errors includes using a structured query language(SQL) function; and
    the constructing of the indoor map further comprises automatically correcting the errors in the drawing operation based on attribute information and image information associated with the points inside the target facility.

13. The method of claim 9, wherein the constructing of the indoor map comprises:
    constructing the indoor map such that the indoor map maps an inside of the target facility to an absolute coordinate system.

14. The method of claim 9, wherein the constructing of the indoor map comprises:
    processing the indoor map to designate a different color to the points inside the target facility.

15. The method of claim 9, further comprising:
    collecting, from a scan device, scan information and image information associated with each of the points inside the target facility.

16. The method of claim 15, wherein the constructing of the indoor map comprises:

correcting a drawing error based on acceleration information associated with the scan device.

17. A method of constructing an indoor map by a scan device, the method comprising:
    generating scan information by scanning points inside a target facility; and
    constructing an indoor map of the target facility by filtering processing the scan information by,
        acquiring attribute information associated with each of the scanning points, the attribute information including at least one of (i) numerical or textual data, or (ii) a determined structure,
        performing a drawing operation based on cloud point information from the scan information,
        mapping the attribute information to space information associated with the target facility to construct the indoor map, and
        determining whether the drawing operation contains errors by detecting whether the attribute information in the indoor map is at least one of (i) incorrect or (ii) missing.

18. The method of claim 17, wherein the constructing of the indoor map comprises:
    constructing the indoor map such that the indoor map connects inner walls of the target facility with lines.

19. The method of claim 18, wherein the constructing of the indoor map comprises:
    performing a primary drawing operation and a secondary drawing operation, the primary drawing operating including drawing the inner walls, and the second drawing operation including drawing an inside of the target facility through a server connected to the scan device.

20. The method of claim 17, wherein the constructing of the indoor map comprises:
    correcting a drawing error based on acceleration information associated with the scan device.

21. The apparatus of claim 1, wherein the processor is configured to acquire the scan information from one or more coordinated scan devices.

22. The apparatus of claim 21, wherein the processor is configured to,
    perform optical character recognition (OCR) on image information received from the one or more coordinated scan devices to generate the attribute information, and
    associate the points with one or more of a plurality of service provider types based on the attribute information.

\* \* \* \* \*